United States Patent Office 3,330,888
Patented July 11, 1967

3,330,888
CYCLIC PHOSPHONATES
Lester Friedman, Beachwood Village, Ohio, assignor, by mesne assignments, to Union Carbide Corporation, a corporation of New York
No Drawing. Original application May 28, 1964, Ser. No. 371,122, now Patent No. 3,246,051, dated Apr. 12, 1966. Divided and this application July 16, 1965, Ser. No. 510,721
1 Claim. (Cl. 260—927)

This application is a division of copending application, Ser. No. 371,122, filed May 28, 1964, now U.S. Patent 3,246,051.

It is an object of the present invention to prepare polyurethanes from phosphites having at least three free hydroxyl groups.

Another object is to prepare polyurethanes from thiophosphates having at least three free hydroxyl groups.

A further object is to prepare polyurethanes from phosphites having at least three free secondary hydroxyl groups.

An additional object is to prepare novel flame-resistant polyurethanes.

A further object is to prepare polyurethanes from hydroxy containing pentaerythritol phospihtes.

Yet another object is to prepare improved foamed polyurethanes.

A still further object is to prepare stabilized polyurethanes.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting certain hydroxyl containing phosphites and/or thiophosphates with an organic polyisocyanate to form polyurethane. Preferably, phosphites are employed so that the polyurethane produced has phosphite groupings therein.

As the phosphorus containing polyhydroxyl compounds for reaction with the organic polyisocyanate there can be employed (1) compounds having the Formula I

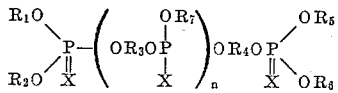

and (2) the phosphite, phosphate and thiophosphate esters of an alkaneether polyol having 3 to 6 hydroxyl groups and being the ether of an alkane polyol having 3 to 6 carbon atoms and 3 to 6 hydroxyl groups with an alkylene glycol or polyalkylene glycol, said phosphite, phosphate or thiophosphate having at least 6 free hydroxyl groups.

In Formula I, $R_1$, $R_2$, $R_5$, $R_6$ and $R_7$ are residues of polypropylene glycol, polyethylene glycol, polytetramethylene glycol or other polyalkylene glycol from which one of the hydroxyl hydrogens has been removed. $R_3$ and $R_4$ are the residues of polyethylene glycol, polypropylene glycol, polytetramethylene glycol or other polyalkylene glycol from which the two hydroxyl groups have been removed, $n$ is zero or an integer and X is nothing, oxygen or sulfur. Preferably, X is nothing, i.e., the compounds are phosphites. Preferably, all of $R_1$, $R_2$, $R_3$, $R_4$, $R_5$, $R_6$ and $R_7$ are the residues of polypropylene glycol. The compounds within Formula I are normally prepared as mixtures. Generally, over 50%, and usually the vast majority of the free hydroxyl groups present, e.g., about 90% are secondary hydroxyl groups when polypropylene glycol is the esterifying alcohol. $R_1$, $R_2$, $R_5$, $R_6$ and $R_7$ in such case normally have the structure

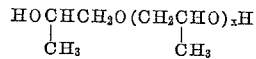

where X is an integer. It has been found that superior polyurethanes are obtained when employing phosphites containing such secondary hydroxyl groups as reactants. In the specific examples the polypropylene glycol derivatives used had about 90% secondary alcohol groups.

The compounds within Formula I which can be employed can be made in the manner set forth in application Ser. No. 129,529. When it is desired to have end groups other than those from polypropylene glycol, then the polypropylene glycol used as the starting material for making the phosphite esters should be replaced in an equimolar amount by the appropriate other glycol, e.g., diethylene glycol or polyethylene glycol 3000.

Also, there can be used glycol copolymers, e.g., block polymers with units of ethylene glycol and propylene glycol. Typical examples of such block polymers are disclosed and claimed in Lundsted Patent 2,674,619. Examples of such block polymers are the block copolymer of Example 1 of Lundsted (polyoxypropylene glycol 1620 molecular weight+17.4% ethylene oxide based on the total product weight), and the block copolymers of Lundsted Example 2, runs 1, 3 and 8.

Examples of polymeric phosphites, phosphates and thiophosphates within Formula I and which can be employed to react with an organic polyisocyanate include phosphites and phosphates such as dipropylene glycol tetrol diphosphite, dipropylene glycol tetrol diphosphate, dipropylene glycol pentol triphosphate, dipropylene glycol pentol triphosphite, dipropylene glycol hexol tetraphosphite, dipropylene glycol hexol tetraphosphate, dipropylene glycol heneicosol decaphosphite, tripropylene glycol tetrol diphosphite, tripropylene glycol hexol tetraphosphite, polypropylene glycol 425 tetrol diphosphite (polypropylene glycol 425 is a mixture of polypropylene glycols having an average molecular weight of about 425), polypropylene glycol 425 tetrol diphosphate, polypropylene glycol 425 hexol tetraphosphite, polypropylene glycol 425 pentol triphosphite, polypropylene glycol 425 pentol triphosphite, polypropylene glycol 425 octol hexaphosphite, polypropylene glycol 2025 hexol tetraphosphate, polypropylene glycol 1025 tetrol diphosphite (polypropylene glycol 1025 is a mixture of polypropylene glycols having an average molecular weight of about 1025), polypropylene glycol 1025 pentol triphosphite, polypropylene glycol 1025 hexol tetraphosphite, polypropylene glycol 1025 heptol pentaphosphite, polypropylene glycol 2025 tetrol diphosphite (polypropylene glycol 2025 is a mixture of polypropylene glycols having an average molecular weight of about 2025), polypropylene glycol 2025 pentol triphosphite, polypropylene glycol 2025 hexol tetraphosphite, polypropylene glycol 3000 tetrol diphosphite, polypropylene glycol 3000 pentol triphosphite, polypropylene glycol 5000 tetrol diphosphite, dipropylene glycol tetrol diethylene glycol diphosphite (where the 4 hydroxy containing end groups are dipropylene glycol residues and the connecting links between the two phosphorus atoms are the diethylene glycol grouping), diethylene glycol tetrol diphosphite, diethylene glycol pentol triphosphite, triethylene glycol tetrol diphosphite, polyethylene glycol 1000 tetrol diphosphite, ditetramethylene glycol tetrol diphosphite and thiophosphates such as dipropylene glycol tetrol dithiophosphate, dipropylene glycol tetrol phosphite thiophosphate, dipropylene glycol tetrol phosphate thiophosphate, dipropylene glycol pentol trithiophosphate, dipropylene glycol hexol tetrathiophosphate, dipropylene glycol octol hexathiophosphate, tripropylene glycol tetrol dithiophosphate, tripropylene glycol hexol tetrathiophosphate, polypropylene glycol 425 tetrol dithiophosphate, polypropylene glycol 425 hexol tetrathiophosphate, polypropylene glycol 1025 tetrol dithiophosphate, polypropylene glycol 1025 hexol tetrathiophosphate, polypropylene glycol 2025 tetrol dithiophosphate, polypropylene glycol 2025 hexol tetrathiophosphate, triethylene glycol tetrol dithiophosphate and polyethylene glycol 1000 pentol trithiophosphate.

Examples of suitable phosphites, phosphates and thiophosphates of alkaneetherpolyols in group (2) which can be employed with an organic polyisocyanate are made in the manner set forth in application 129,529 and include tris (propylene oxide-1,2,6 hexanetriol adduct) phosphite wherein the adduct has a molecular weight of 750 (tris LHT 240 phosphite), the tris esters of phosphorous acid and the adducts of propylene oxide and 1,2,6-hexanetriol having molecular weights of 1500, 2400 and 4000 (tris LHT 112 phosphite, tris LHT 67 phosphite and tris LHT 42 phosphite respectively), tris (propylene oxide-glycerine adduct) phosphite where the adduct has a molecular weight of 1000 (tris LG–168 phosphite), the corresponding phosphite of the propylene oxide-glycerine adduct having a molecular weight of 3000 (tris LG–56 phosphite), tris (sorbitol-propylene oxide adduct) molecular weight 1000 phosphite, tris (trimethylolpropanepropylene oxide adduct molecular weight 1700) phosphite, tris (ethylene oxide-glycerine adduct molecular weight 1000) phosphite, tris (trimethylolethane-propylene oxide adduct molecular weight 2000) phosphite, tris (mannitol-propylene oxide adduct molecular weight 3000) phosphite, tris (sorbitol-propylene oxide adduct molecular weight 3000) phosphite, tris (sorbitol-propylene oxide adduct molecular weight 2500) phosphite, tris (pentaerythritol-propylene oxide adduct molecular weight 1000) phosphite; tris (pentaerythritol-propylene oxide adduct molecular weight 750) phosphite, tris (pentaerythritol-propylene oxide adduct molecular weight 2000) phosphite as well as the corresponding pentaerythritol-propylene oxide adducts of molecular weights 400, 450, 500, and 600 (Pluracols PeP). These adduct phosphites can also be named as phosphites of the ether of propylene glycol, ethylene glycol, polyethylene glycol or polypropylene glycol, and the polyhydric alcohol employed, e.g., tris (glycerine-polypropylene glycol 3000 ether) phosphite (tris LG–56 phosphite), adducts of trimethylolpropane and propylene oxide of molecular weights 300, 400, 700, 1500, 2500 and 4000 (Pluracol TP). Also there can be used adducts of ethylene oxide and propylene oxide, such as those in the aforementioned Lundsted patent, e.g., Example 1 and Example 2 runs 1, 3 and 8 thereof. Thus, there can be used the adduct of polyoxypropylene polymer molecular weight 926 with 45% by weight of polyoxyethylene content. The invention further includes as phosphites which can be included in group (2) as suitable reactants with the organic polyisocyanate, polyphosphites such as those set forth in Examples 41 and 42 of the parent application, e.g. LHT 240 nonoldiphosphite, LHT 240 dodeca-ol triphosphite, the diphosphite of sorbitol-propylene oxide adduct having a molecular weight to 1000; the triphosphite of sorbitol-propylene oxide adduct having a molecular weight of 1000, the diphosphite of pentaerythritol-propylene oxide adduct having a molecular weight of 1000) or the adducts of molecular weights 400, 450, 500 and 600) and the triphosphite of pentaerythritol-propylene oxide adduct having a molecular weight of 1000 (or the adducts of molecular weights 400, 500 and 600) as well as the diphosphite of trimethylolpropane-propylene oxide adduct molecular weights 300, 400, 700, 1500, 2500 and 4000, and the corresponding triphosphites.

As examples of suitable thiophosphates and phosphates in group (2) there can be mentioned tris LHT 42 thiophosphate, tris LHT 42 phosphate, tris LHT 67 phosphate, tris LHT 240 phosphate, tris LHT 67 thiophosphate, tris LHT 112 thiophosphate, tris LHT 240 thiophosphate, tris LG–56 thiophosphate, tris LG–168 thiophosphate, tris LG–56 phosphate, tris LG–168 phosphate, tris-pentaerythritol-propylene oxide 450 phosphate and the corresponding thiophosphate, tris-trimethylolpropane-propylene oxide molecular weight 700 phosphate and the corresponding thiophosphate.

The preferred compounds for forming polyurethanes whether within Formula I or group (2) are phosphites and the most preferred are the phosphites of derivatives of polypropylene glycol which phosphites have a majority of secondary alcohol groups.

In the following description of reaction procedure, it is to be understood that when reference is made to the use of phosphites, since these are the preferred reactants, that the same reaction conditions can be used with the phosphates and thiophosphates.

The phosphites, e.g., polyphosphites set forth supra (or the thiophosphates) can be the sole hydroxyl reactant present or they can be used in admixture with other polyhydroxy compounds (polyols) in forming the polyurethanes. Foamed polyurethanes can be obtained by adding water prior to or simultaneously with the addition of the polyisocyanate.

Alternatively, foams can be prepared by uniformly distributing a liquefied halogen substituted alkane containing at least one fluorine atom in its molecule and having a boiling point at one atmosphere pressure not higher than 80° F. and preferably not lower than −60° F. in either the phosphite (or mixture of phosphite and other polyhydroxy compound) reactant or the polyisocyanate reactant and then mixing the reactants and permitting the temperature of the mixture to rise during the ensuing reaction above the boiling point of the liquefied gas to produce a porous polyurethane. Such fluorine containing compounds include dichlorodifluoromethane, dichloromonofluoromethane, chlorodifluoromethane, and dichlorotetrafluoroethane. The foams can be formed with such fluorine containing compounds in the manner described in General Tire British Patent 821,342.

Foamed polyurethanes can be made by either the one shot or two step procedures. In the case of the reaction of phosphites having a hydroxyl number above 125 in order to form a good flexible foam it is often desirable to employ the two step procedure unless an additional polyhydroxy reactant is added to lower the hydroxyl number of the hydroxy reactants to below 125 and preferably below 100, e.g., as low as 25, but preferably at least 35.

In preparing urethane foams according to the invention a rigid foam is made utilizing a polyol phosphite of the type set forth supra (or mixture of such phosphite and another polyhydroxy containing compound) having a hydroxyl number of 350–750; a semi-rigid foam is prepared if the hydroxyl number is 75–350, and a flexible foam is prepared if the hydroxyl number is 35–75.

The polyurethanes prepared according to the present invention are solids. They have good flame-proofing properties and in the foamed form are useful as linings for textiles, e.g., coats, suits and dresses, insulation in building construction, upholstery, filling material, pillows, hair curlers, brushes, carpet underlays or backings, shock absorbent filling for packages, etc.

The unfoamed polyurethane products are useful wherever elastomeric polyurethanes can be employed with the advantage of improved flame and fire resistance. The elastomers in thread form can be employed in making girdles. The unfoamed polyurethanes are suitable for molding cups and other articles, and as protective coatings for steel, wood and glass.

The polyurethanes can be cured in conventional fashion, e.g., in an oven at 110° C.

As examples of organic polyisocyanates which can be employed to make the polyurethane there can be employed toluene-2,4-diisocyanate, toluene - 2,6 - diisocyanate, 4-methoxy-1,3-phenylene diisocyanate, diphenyl methane-4-4'-diisocyanate, 4-chloro-1,3-phenylene-diisocyanate, 4-isopropyl-1,3-phenylene-diisocyanate, 4-ethoxy-1,3-phenylene-diisocyanate, 2,4-diisocyanato-diphenyl-ether, 3,3'-dimethyl-4,4'-diisocyanatodiphenyl methane, mesitylene diisocyanate, durylene diisocyanate, 4,4'-methylene-bis (phenylisocyanate), benzidine diisocyanate, o-nitrobenzidine diisocyanate, 4,4'-diisocyanato-dibenzyl, 3,3'-bitolylene-4,4'-diisocyanate, 1,5-naphthalene diisocyanate, tetramethylene diisocyanate, hexamethylene diisocyanate, decamethylene diisocyanate, toluene-2,4,6-triisocyanate, tritolylmethane triisocyanate, and 2,4,4'-triisocyanatodiphenyl ether, the reaction product of toluene diisocyanate with trimethylolpropane at an NCO/OH ratio of 2:1 (Mondur CB), the reaction product of toluene diisocyanate with 1,2,6-hexanetriol at an NCO/OH ratio of 2:1, the reaction product of toluene diisocyanate with the polyol phosphite at an NCO/OH ratio of 2:1, e.g., when the polyol phosphite is dipropylene glycol tetrol diphosphite or tris (pentaerythritol-polypropylene glycol ether) phosphite.

Alternatively, as the polyisocyanate there can be used prepolymers made by reacting one or more of the above polyisocyanates with a polyhydroxy compound such as a polyester having terminal hydroxyl groups, a polyhydric alcohol, glycerides, hydroxy containing glycerides, etc. The prepolymers should have terminal isocyanate groups. To insure this it is frequently desirable to employ an excess of 5% or more of the polyisocyanate in forming the prepolymer.

Typical examples of such prepolymers having isocyanate end groups are those formed from toluene diisocyanate and polyhydroxy compounds. Unless otherwise indicated, in the illustrative examples a mixture of 80% 2,4-isomer and 20% 2,6-isomer of toluene diisocyanate was employed in making the prepolymer. Thus, there can be used the prepolymers from toluene diisocyanate and castor oil, toluene diisocyanate and blown tung oil (or blown linseed oil or blown soya oil), toluene diisocyanate and the polyester of ethylene glycol, propylene glycol and adipic acid having a molecular weight of 1900 described in Example I of Kohrn Patent 2,953,839, as well as the isocyanate terminated prepolymers in Examples II–VIII, inclusive, of the Kohrn patent toluene diisocyanate and polytetramethylene glycol (1000 molecular weight), toluene diisocyanate and polypropylene glycol (molecular weight 2025), toluene diisocyanate and dipropylene glycol, toluene diisocyanate and polypropylene glycol (molecular weight 1025), toluene diisocyanate and LG–56 (glycerine-propylene oxide adduct having a molecular weight of 3000), toluene diisocyanate and 1,2,6-hexanetriol-propylene oxide adducts having molecular weights of 500, 700, 1500, 2500, 3000 and 4000, hexamethylene diisocyanate and pentaerythritol, toluene diisocyanate and polyethylene sebacate, toluene diisocyanate and a mixture of 98% polypropylene glycol (molecular weight 1900) with 2% 1,2,6-hexanetrio, toluene diisocyanate and a copolymer of ethylene oxide and propylene oxide having a molecular weight of 2020, toluene diisocyanate and glyceryl adipate phthalate polymer, toluene diisocyanate and a mixture of polypropylene ether glycol molecular weight 995 and castor oil as described in Example 2 of Kane Patent 2,955,091, as well as the other prepolymers set forth in Examples 1 and 3–11 of Kane, toluene diisocyanate and polypropylene ether glycol (molecular weight 1800) of Example I of Swart Patent 2,915,496 and the prepolymers of Examples II, III, VI and VIII of the Swart patent. Toluene diisocyanate and tris (dipropylene glycol) phosphite; toluene diisocyanate and tris (polypropylene glycol 2025) phosphite.

As previously stated, the polyol phosphites of the present invention can be the sole hydroxyl reactant present or they can be used in admixture with other polyhydroxyl compounds in forming the polyurethanes. Examples of such compounds are polyethylene glycols having molecular weights of 400 to 3000, polypropylene glycols having molecular weights of 400 to 3000, ethylene glycol, diethylene glycol, triethylene glycol, propylene glycol, dipropylene glycol, tripropylene glycol, 1,4-butanediol, thiodiglycol, glycerol, trimethylolethane, trimethylolpropane, ether triols from glycerine and propylene oxide having molecular weights of 1000 and 3000 (available commercially as LG–168 and LG–56, respectively) ether containing triols from 1,2,6-hexanetriol and propylene oxide having molecular weights of 750, 1500, 2400, and 4000 (available commercially as LHT 240, LHT 112, LHT 67 and LHT 42, respectively), sorbitol-propylene oxide adduct having a molecular weight of 1000, pentaerythritol-propylene oxide adduct having a molecular weight of 1000, trimethylol phenol, oxypropylated sucrose, triethanolamine, pentaerythritol, diethanolamine, castor oil, blown linseed oil, blown soya oil, N,N,N',N'-tetrakis (2-hydroxyethyl) ethylenediamine, N,N,N',N'-tetrakis (2-hydroxypropyl) ethylenediamine, mixed ethylene glycol-propylene glycol adipate resin (molecular weight 1900), polyethylene adipate phthalate, polyneopentylene sebacate, the product made by reacting an excess of 1,4-butanediol with adipic acid and including a small amount of a triol, e.g., one molar equivalent of trimethylol propane for each 300 to 12,000 molecular weight units of polyester, polyester from 16 moles adipic acid, 16 moles diethylene glycol and 1 mole of trimethylol propane, oxypropylated p-tertiary butylphenolformaldehyde resin of Example 2b of De Groote Patent 2,499,365 and the other oxyalkylated resins of De Groote, tris (dipropylene glycol) phosphite, and tris (polypropylene glycol 2025) phosphite.

From 5 to 100% by weight of the hydroxyl component can be the polyol phosphites of the present invention, i.e., Formula I and group (2) supra. As previously indicated when employing a polyol phosphite having a hydroxyl number above 125 in order to form good flexible foams preferably 5–85% of the hydroxyl containing substance is such material and the balance is tris poly propylene glycol 2025 phosphate, or LG–56 or other polyol which will reduce the hydroxyl number to below 100 and preferably to between 30 and 75, if the polyol phosphite has too low a hydroxyl number then it can be blended with another polyol phosphite or polyol to bring the hydroxyl number in the proper range for foaming a good foam.

The polyol phosphites also can be employed as light stabilizers for polyurethane resins made from any of the nonphosphorus containing polyols set forth above. For such use the polyol phosphite is employed in an amount of from 0.1–15% by weight of the polyol, e.g., 2.2% by weight of dipropylene glycol tetrol diphosphite is added to 144 grams of LG–56. Conventional catalysts and surfactants are also employed. This mixture is stable and can be added to 5.2 grams of toluene diisocyanate and 0.37 gram of water to form a light stable foamed polyurethane. The dipropylene glycol tetrol diphosphite and the other polyol phosphites not only act to stabilize the nonphosphorus containing polyol employed as well as the polyurethane product but also serves as reactants.

In preparing the cured and/or foamed polyurethanes any of the conventional basic catalysts, i.e., N-methyl morpholine, N-ethyl morpholine, 1,2,4-trimethylpiperazine, trimethyl amine, triethyl amine, tributyl amine and other trialkyl amines, the esterification product of 1 mole of adipic acid and 2 moles of diethylethanolamine, triethyl amine citrate, 3-morpholinepropionamide, 1,4-bis (2-hydroxypropyl)-2-methylpiperazine, 2-diethylaminoacetamide, 3-diethylaminopropionamide, diethylethanolamine, triethylenediamine, N,N,N',N'-tetrakis (2-hydroxypropyl) ethylenediamine (Quadrol), N,N'-dimethylpiperazine, N,N-dimethylhexahydroaniline, tribenzylamine and sodium phenolate. There can also be used tin compounds, e.g., hydrocarbon tin acylates such as dibutyltin dilaurate, dibutyltin diacetate, dibutyltin dioctoate, tributyltin monolaurate, dimethyltin diacetate, dioctyltin diacetate, dilauryltin diacetate, dibutyltin maleate, hydrocarbon tin alkoxides, e.g., dibutyltin diethoxide, dibutyltin dimethoxide, diethyltin dibutoxide as well as other tin componnds, e.g., octylstannoic acid, trimethyltin hydroxide, trimethyltin chloride, triphenyltin hydride, triallyltin chloride, tributyltin fluoride, dibutyltin dibromide, bis (carboethoxymethyl) tin diiodide, tributyltin chloride, trioctyltin acetate, butyltin trichloride, octyltin tris-(thiobutoxide), dimethyltin oxide, dibutyltin oxide, dioctyltin oxide, diphenyltin oxide, stannous octanoate, stannousoleate, as well as the other tin compounds set forth in Hostettler French Patent 1,212,252.

Conventional surfactants can be added in the amount of 1% or less, e.g., 0.2% by weight of the composition. The preferred surfactants are silicones e.g. polydimethyl siloxane having a viscosity of 3 to 100 centistokes, triethoxydimethyl polysiloxane, molecular weight 850 copolymerized with a dimethoxypolyethylene glycol having a molecular weight of 750, as well as any of the other siloxanes disclosed in Hostettler French Patent 1,212,252.

Unless otherwise indicated, all parts and percentages are by weight.

In preparing polyurethanes the following values are of interest.

| Compound | Molecular Weight | OH Number | OH Equivalent in Grams * |
|---|---|---|---|
| Dipropylene glycol tetrol diphosphite | 726 | 309 | 2.61 |
| Dipropylene glycol pentol triphosphite | 1,022 | 274 | 2.95 |
| Polypropylene glycol 425 tetrol diphosphite | 2,181 | 103 | 7.56 |
| Dipropylene glycol hexol tetraphosphite | 1,318 | 256 | 3.17 |
| Polypropylene glycol 425 pentol triphosphite | 3,059 | 92 | 8.77 |
| Tripropylene glycol tetrol diphosphite | 1,018 | 220 | 3.68 |
| Polypropylene glycol 1025 tetrol diphosphite | 5,181 | 43 | 18.8 |
| Polypropylene glycol 2025 tetrol diphosphite | 10,181 | 22.2 | 36.4 |
| Polypropylene glycol 1025 pentol triphosphite | 7,259 | 38.6 | 20.9 |
| LHT 240 hexolphosphite | 2,100 | 160 | 5.03 |
| LG 168 hexol phosphite | 3,028 | 111 | 7.28 |
| Bis dipropylene glycol pentaerythritol diphosphite | 460 | 243 | 3.31 |
| Dipropylene glycol tetrol dithiophosphate | 790 | 284 | 2.82 |
| Bis polypropylene glycol 425 pentaerythritol diphosphite | 1,350 | 83 | 9.7 |
| LHT 240 nonol diphosphite | 3,806 | 133 | 6.06 |
| LHT 240 dodeca-ol triphosphite | 5,334 | 126 | 6.4 |
| Tris(sorbitol-propylene oxide adduct) phosphite | 3,028 | 278 | 2.9 |
| Tris (pentaerythritol-polypropylene glycol ether) phosphite | 1,230 | 410 | 1.96 |

*Equivalent to 14.4 grams of LG-56 (glycerine-propylene oxide adduct; triol with hydroxyl number of 56).

In the following examples, unless otherwise indicated, the toluene diisocyanate employed was a mixture of 80% of the 2,4-isomer and 20% of the 2,6-isomer.

In preparing one shot foams there was utilized the following standard formulation:

| | Grams |
|---|---|
| Water | 0.37 |
| Dibutyltin dilaurate | 0.07 |
| Polydimethyl siloxane (50 centistokes grade) | 0.12 |
| N-ethyl morpholine | 0.1 |
| Polyol | As indicated |

This mixture is designated in the following example as formulation A.

Foams were made by adding formulation A to 5.2 grams of the toluene diisocyanate. The foams were then cured in a 110° C. oven for about 20 minutes.

In the comparison or control example there was employed 14.4 grams of LG-56 as the polyol. Utilizing a 10 ounce cup the LG-56 foam rose 1.5 inches above the top of the cup.

Example 1

The polyol used in formulation A was a mixture of 1.3 ml. (about 1.3 grams) of dipropylene glycol tetrol diphosphite and 7 grams of LG-56. Upon addition of 5.2 grams of toluene diisocyanate there was a rapid cream time and rise. A nice foam was produced having closed cells.

In Example 1 and the other foam examples silicone fluid 520 was equally effective when employed in place of the polydimethyl siloxane in the same amount.

Example 2

The polyol used in formulation A was a mixture of 1.4 ml. (about 1.4 grams) of dipropylene glycol pentol triphosphite and 7 grams of LG-56. Upon addition of 5.2 grams of toluene diisocyanate there was a rapid cream time and rise. The product had closed cells which were broken by hand crushing. After curing the product had nice tensile strength and hand properties.

Example 3

The polyol used in formulation A was a mixture of 1.3 ml. of dipropylene glycol tetrol diphosphite and 7 grams of polypropylene glycol 2025. After adding 5.2 grams of toluene diisocyanate the foamed product had closed cells.

Example 4

The polyol used in formulation A was 4.9 grams of LHT 240 hexol phosphite. After adding 5.2 grams of toluene diisocyanate there was a moderate foam rise which yielded a rigid foam. It was fairly strong after curing for 1 hour at 120° C. The white product appeared to be a good foam with low density.

Example 5

The polyol used in formulation A was a mixture of 2.5 grams of LHT 240 hexol phosphite and 7.2 grams of polypropylene glycol 2025. After adding 5.2 grams of toluene diisocyanate a foamed open cell product of the semi-rigid type was produced.

Example 6

The procedure of Example 5 was repeated but the polypropylene glycol 2025 was replaced by 7.2 grams of LG-56. A closed cell semi-rigid foam was produced.

Example 7

42 ml. of octano solvent were heated to 70° C. and then 10.0 ml. of bis polypropylene glycol 425-pentaerythritol diphosphite (molecular weight 1200–1500) added. The mixture was heated to boiling and a little water present azeotroped out. Then 1.74 ml. of toluene diisocyanate was added and the mixture refluxed for 2 hours. Next 0.65 ml. of water was added and the mixture refluxed an additional 30 minutes. This precipitated a mass of polymer granules. The mixture was cooled to 50° C. and the product filtered off and air dried in an oven at 50° C. The product was ground in a mortar with a pestle to give a rubbery substance. This was placed in a Carver press at 15,000 p.s.i. to give a hard rubber-like block. It was translucent white in color and appeared to be a good elastomer. The product was suitable to mold cups and could be employed to spin threads.

In place of bis polypropylene glycol 425-pentaerythritol diphosphite there can be used other bis polypropylene glycol pentaerythritol diphosphites, e.g., bis dipropylene glycol pentaerythritol diphosphite (molecular weight 460), bis polypropylene glycol 1025-pentaerythritol diphosphite and bis polypropylene glycol 2025-pentaerythritol diphospite. Less preferably the corresponding polyethylene glycol pentaerythritol diphosphites can be employed.

The bis polypropylene glycol pentaerythritol diphosphites and the like can be employed to form polyurethane foams either alone or admixed with other polyols, e.g., 4.8 grams of bis polypropylene glycol 425 pentaerythritol diphosphite and 7.2 grams of LG-56 can be used as the polyol in formulation A to react with 5.2 grams of toluene diisocyanate.

Example 8

The polyol used in formulation A was 6 grams of LHT 240 nonol diphosphite. After adding 5.2 grams of toluene diisocyanate a rigid foamed product was obtained.

Example 9

The polyol used in formulation A was a mixture of 1.4 grams of tris (sorbitol-propylene oxide adduct molecular weight 1000) phosphite (also called tris sorbitol-polypropylene glycol ether-phosphite) and 7.2 grams of polypropylene glycol 2025. After adding 5.2 grams of toluene diisocyanate a foamed product was obtained.

Example 10

The polyol used in formulation A was a mixture of 2.4 grams of tris (pentaerythritol-propylene oxide adduct molecular weight 1000) phosphite and 7.2 grams of LG-56. After adding 5.2 grams of toluene diisocyanate a foamed product was obtained.

Example 11

The polyol used in formulation A was 18.8 grams of polypropylene glycol 1025 tetrol diphosphite. After adding 5.2 grams of toluene diisocyanate a foamed product was produced.

Example 12

Formulation A was used omitting the water and employing 5.15 grams of LHT 240 hexol phosphite. There was then added 5.2 grams of toluene diisocyanate and the mixture allowed to react to form a prepolymer. There was then added 0.37 ml. of water and a nice light foam was obtained which was cured at 110° C.

Example 13

72.6 grams (0.1 mole) of dipropylene glycol tetrol diphosphite, 48.3 grams (0.22 mole) of toluene diisocyanate (80/20 2,4/2,6 isomer ratio) were heated together at 90° C. for one hour and dissolved in 100 ml. of dimethyl formamide and portions of the product were painted on (a) a glass petri dish, (b) a steel plate and (c) a piece of wood. The samples were placed in an oven at 120° C. for one hour to remove the solvent and then air cured for 4 hours. In all cases a resin coating was obtained which did not burn and acted as a fire retardant paint.

Example 14

The polyol employed in formulation A was a mixture of 4.3 grams of palypropylene gylcol 425 pentol triphosphite and 7 grams of a polyester of molecular weight about 2000, hydroxyl number of 62.4 and acid number of 0.4 (made from adipic acid and a mixture of 50% diethylene glycol and 50% 1,5-pentanediol) to produce a nice cured foam.

Example 15

The polyol employed in formulation A was 14 grams of LG-56 to which had been added 0.2 gram of polypropylene glycol 425-tetrol diphosphite as a stabilizer. After addition of the 5.2 grams of toluene diisocyanate there was produced a nice foam which was cured at 110° C. for 20 minutes.

Example 16

The procedure of Example 15 was repeated but the polypropylene glycol 425-tetrol diphosphite was replaced by 0.1 gram of bis dipropylene glycol pentaerythritol diphosphite.

Example 17

Monomeric and polymeric esters can be made by reacting tetramethyl cyclobutanediol 1,3 with (1) a 3,9 dihydrocarbonoxy 2,4,8,10 - tetraoxa - 3,9 - diphosphaspiro (5,5) undecane or (2) a mixture of a trihydrocarbon or trihaloaryl phosphite and pentaerythritol. The reaction can be catalyzed by the addition of 0.1 to 5% of an alkali metal alcoholate or phenolate or 0.1 to 5% of a dihydrocarbon phosphite or dihaloaryl phosphite based on the weight of the phosphorus compound. Any of the catalysts of these groups set forth in application Ser. No. 111,899, filed May 23, 1961, now U.S. Patent No. 3,053,878, can be used. The molecular weight of the polymer will depend on the mole ratio of the reactants. When the tetramethyl cyclobutanediol and spiro compound are employed in a mole ratio of 1:1 the highest molecular weight polymers are formed. As the mole ratio departs from unity the molecular weights decrease and at a mole ratio of 2:1 or higher, for example a monomeric product is produced.

Thus a high molecular weight polymer is produced by heating 2.00 moles of tetramethyl cyclobutanediol 1,3 with 2.07 moles of diphenyl pentaerythritol diphosphite in the presence of 5 grams (0.02 mole) of diphenyl phosphite. The mixture is heated at 220° C. at 10 mm. until the yield of phenol obtained by distillation is almost quantitative. The solid polymer produced is more resistant to hydrolysis than the polymers usually produced by reacting a dihydric alcohol with diphenyl pentaerythritol diphosphite. It can be molded to form a cup.

A similar product is produced by replacing the diphenyl pentaerythritol diphosphite by 2.07 moles of didecyl pentaerythritol diphosphite and removing the decyl alcohol formed by distillation at 10 mm.

A monomer can be formed by heating 2 moles of tetramethylcyclobutanediol 1,3 with 1 mole of diphenyl pentaerythritol diphosphite in the presence of 0.02 mole of diphenyl phosphite and heating at 10 mm. until 1 mole of phenol is removed by distillation. This reaction can also be carried out by adding 2.5 moles of the tetramethylcyclobutanediol 1,3 and subsequently removing the excess 0.5 mole of the cyclobutanediol by distillation.

The monomer and polymers of Example 17 are useful as stabilizers for polyethylene, polypropylene, polyurethanes and the like.

Example 18

Tris (2,3,4,4-tetramethylcyclobutanediol-1,3) phosphite is made by reacting 1 mole of triphenyl phosphite, 3 grams of diphenyl phosphite (0.01 mole, catalyst) and 3.3 moles (a 10% excess) of 2,2,4,4-tetramethylcyclobutanediol-1,3 in vacuo at 10 mm. The 3 moles of phenol formed were removed by distillation at this pressure as was the 10% excess tetramethyl cyclobutanediol to leave the tris (tetramethylcyclobutanediol-1,3) phosphite as a viscous liquid residue. This compound can be reacted with toluene diisocyanate and the other polyisocyanates mentioned supra to form flame proof polyurethane resins. Thus in formulation A above there can be used a mixture of 1 gram of tris (tetramethylcyclobutanediol) phosphite and 7 grams of LG-56. Upon addition of 5.2 grams thus was obtained a good solid foam.

The tris (tetramethylcyclobutanediol) phosphite also can be used to form polyurethane prepolymers, e.g., by omitting the water from formulation A and employing 2.0 grams of the tris (tetramethylcyclobutanediol) phosphite as the polyol and then adding 5.2 grams of toluene diisocyanate. After the mixture is allowed to react to form a prepolymer then 0.37 ml. of water is added to produce a foam.

The polyurethane thus produced was a flame resistant rigid foam which could be used as insulation in building construction, etc.

The tris (tetramethylcyclobutanediol) phosphite also can be employed to form polyesters or can be used with epoxy compounds in forming resins.

Tris (tetramethylcyclobutanediol) phosphite has the formula

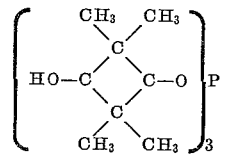

The following examples are directed to phosphonates and to flame resistant polyurethanes made therefrom. The phosphonates also can be used to form flame resistant polyesters by reacting with polybasic acids, e.g., terephthalic acid, phthalic acid and adipic acid. Such polyester can be employed for example as protective coatings for wood, metal or the like. The polyurethanes can be foamed in the manner previously set forth to form flame resistant foams useful as building insulation, clothing insulation or any other of the other uses previously set forth. The unfoamed polyurethanes can be employed as protective coatings for wood or metal.

The phosphonates can also be used in epoxy resin formulation.

*Example 19*

Dipropylene glycol hydroxypropoxypropane phosphonate was prepared by treating tris dipropylene glycol phosphite with 5 mol percent of n-butyl bromide at 125–135° C. for 8 hours at which time there was no increase in P=O bond in the infrared analysis. Volatile material was stripped off at 150° C. and 10 mm. The liquid residue was essentially pure bis dipropylene glycol hydroxypropoxypropane phosphonate contaminated with about 5% of dipropylene glycol butane phosphonate. The dipropylene glycol phosphonate had the formula

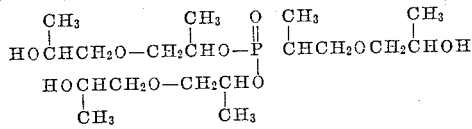

*Example 20*

1 mole of bis dipropylene glycol hydrogen phosphite was reacted with 1 mole of propylene oxide in the presence of 5 grams of potassium carbonate at 75° C. to produce bis dipropylene glycol 2-hydroxypropane phosphonate. Similar reactions can be carried out with ethylene oxide or butylene oxide and utilizing other alkaline catalysts, e.g., slaked lime, tetramethyl guanidine and pentamethyl guanidine.

*Example 21*

1 mole of tris dipropylene glycol phosphite was heated with five moles of propylene chlorhydrin (1-chloro-2-hydroxypropane) for 8 hours at 125–135° C. The excess propylene chlorhydrin and the chloropropyl hydroxy propyl ether formed were stripped off in a vacuum (10 mm.) and bis dipropylene glycol 2-hydroxypropanephosphonate recovered as the residue.

Bis dipropylene glycol hydroxyethane phosphonate can be obtained by substituting ethylene chlorhydrin for propylene chlorhydrin in this reaction. Propylene bromohydrin can be employed in place of propylene chlorhydrin. If the amount of propylene chlorhydrin is reduced, e.g., to a 1 to 1 mole ratio with the tris (dipropylene glycol) phosphite then there is obtained a mixture of bis dipropylene glycol 2-hydroxy propane phosphonate and bis dipropylene glycol hydroxypropoxypropane phosphonate as the product.

*Example 22*

The reaction set forth in Example 20 can also be carried out with the polymeric dipropylene glycol hydrogen phosphites. Thus one mole of trimeric dipropylene glycol hydrogen phosphite can be reacted with 3 moles of propylene oxide in the presence of 5 grams of tetramethyl guanidine to produce the corresponding hydroxypropane phosphonate according to the equation

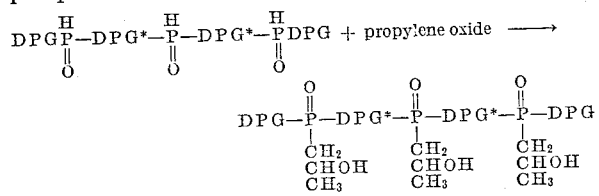

where DPG is dipropylene glycol with a hydroxyl hydrogen removed and DPG* is dipropylene glycol with both hydroxyl hydrogens removed. The starting phosphite can be prepared by heating bis dipropylene glycol hydrogen phosphite in a vacuum and distilling off the requisite amount of dipropylene glycol formed.

In place of propylene oxide there can be used ethylene oxide and butylene oxide. If an excess of alkylene oxide is used in Examples 20 and 22 then further etherification of any of the free hydroxyl groups will occur. Normally this is not preferable since the amount of phosphorus in the molecule is reduced.

*Example 23*

Example 19 was repeated replacing the tris dipropylene glycol phosphite by tris tripropylene glycol phosphite to produce tripropylene glycol 2-hydroxypropoxypropoxy propane phosphonate.

In similar fashion tris LHT–240 phosphite can be rearranged to the corresponding phosphonate.

*Example 24*

1 mole of tris dipropylene glycol phosphite was treated with 1 mole of 1,4-dichlorobutene-2 at 90–100° C. After the exotherm was over the mixture was stripped of volatiles at 120° C. at 10 mm.; cooled to 100° C. and treated with an additional mole of tris dipropylene glycol. When the reaction was over (no heat rise was observed) the mixture was stripped of volatiles. The volatile products were essentially propylene chlorohydrin. The reaction product was essentially tetradipropylene glycol 1,4-butene-2-diphosphonate, an amber somewhat viscous oil having the formula:

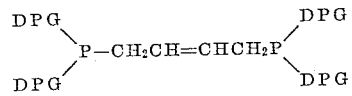

This product was reacted with 1 equivalent of bromine to obtain the corresponding 2,3-dibromide.

*Example 25*

Dipropylene glycol tetrol diphosphite was treated with 2.5 mole percent of butyl bromide until phosphonate formation appeared to be complete (8 hours at 125–135° C.). Volatiles were stripped out at 10 mm. pressure. The light colored viscous liquid was a mixture of

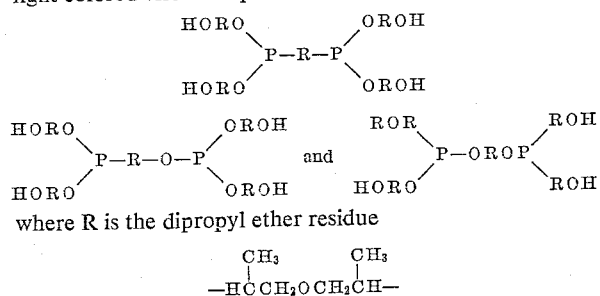

where R is the dipropyl ether residue $$-\overset{CH_3}{\underset{|}{H}C}CH_2OCH_2\overset{CH_3}{\underset{|}{C}H}-$$

In a similar fashion tripropylene glycol tetrol diphosphite is treated with butyl bromide to give an analogous product.

The products of Examples 19–25 as previously stated can be reacted with organic polyisocyanates to form polyurethanes. To reduce the hydrophylic properties it has been found that it is preferable to have hydroxypropyl or hydroxypropoxy propyl groups present rather than hydroxyethyl or hydroxyethoxyethyl groups.

To form polyurethanes in addition to the novel phosphonates of Examples 19–25 there can also be used hydroxyalkyl and hydroxyalkoxyalkyl esters of hydrocarbon and halohydrocarbon phosphonates such as the bis propylene glycol ester of decanephosphonic acid bis dipropylene glycol ester of decanephosphonic acid, bis dipropylene glycol ester of methanephosphonic acid, bis dipropylene glycol ester of cyclohexane phosphonic acid, bis propylene glycol ester of methanephosphonic acid, bis propylene glycol ester of cyclohexanephosphonic acid, bis propylene glycol ester of phenylphosphonic acid, bis dipropylene glycol ester of phenylphosphonic acid, bis dipropylene glycol ester of 4-cholrophenylphosphonic acid, tetra 2'-hydroxypropyl ethane-1,2-diphosphonate, tetra 2'-hydroxypropoxyethane-1,2-diphosphonate, tetra 2'-hydroxypropoxypropylethane-1,2-diphosphonate, tetra 2'-hydroxypropoxypropyl-1,4-butane diphosphonate, tetra 2'-hydroxypropoxypropyldecane-1,10-diphosphonate, tetrapolypropylene glycol molecular weight 2025 1,6-hexane diphosphonate, and tetrapolypropylene glycol molecular weight 2025 1,6-hexane 2-diphosphonate.

*Example 25a*

The polyol used in Formula A was a mixture of 1 gram of the diphosphonate prepared in Example 24 and 7 grams of LG–56. A foam was made upon addition of 5.2 grams of toluene diisocyanate.

*Example 25b*

The procedure of Example 25a was repeated replacing the diphosphonate with tetra 2'-hydroxypropoxypropyl-1,4-butane diphosphonate to obtain a foam.

*Example 26*

The polyol used in Formula A was a mixture of 1 gram of bis dipropylene glycol 2-hydroxypropoxypropane phosphonate and 7 grams of LG–56. Upon addition of 5.2 grams of toluene diisocyanate a good foam was produced.

*Example 27*

The polyol used in Formula A was a mixture of 1 gram of bis dipropylene glycol 2-hydoxypropane phosphonate and 7 grams of LG–56. Upon addition of 5.2 grams of toluene diisocyanate a good foam was produced.

*Example 28*

Formulation A was used omitting the water and employing 1.89 grams of bis dipropylene glycol 2-hydroxypropoxypropane phosphonate. There was then added 5.2 grams of toluene diisocyanate and the mixture allowed to react to form a prepolymer. There was then added 0.37 ml. of water and a light foam produced which was cured at 110° C. for 20 minutes.

It is also within the contemplation of the present invention to prepare phosphites from poly alcoholic hydroxyl containing aromatic compounds. The phosphites thus prepared can be reacted with any of the above mentioned isocyanates to prepare polyurethanes which can be employed for all of the uses of polyurethanes previously set forth. Preferably the alcoholic groups are secondary alcoholic groups.

An example of a phosphite of this class which can be prepared and further reacted to form polyurethanes is the phosphite having 6 free hydroxyl groups made by reacting 3 moles of 1,1,3 - tris[p - (2 - hydoxypropoxy) phenyl]propane with one mole of triphenyl phosphite (or other triaryl or trialkyl phosphite). In the reaction the phenol from the triphenyl phosphite is removed and there is obtained a product having the following formula:

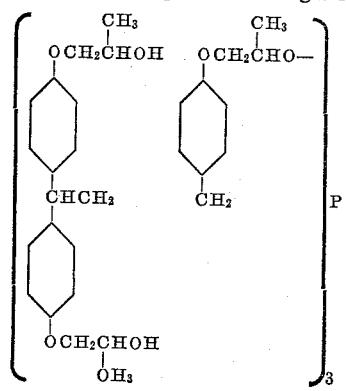

While the formula is written as if all of the bonds to the phosphorous are from the propylene glycol unit attached to the aromatic group on the number 3 carbon atom of the propane chain, in actual practice a mixture of isomeric compounds is obtained in which the bonds to the phosphorus can be from any of the three propylene glycol units available on the starting aromatic compound.

In place of employing pure 1,1,3-tris[p-(2-hydroxypropoxy)phenyl]propane there can be employed the mixture of this compound and the propylene oxide adduct of glycerine having a hydroxyl number of 625–650. This mixture is available commercially as LK–380, hydroxyl number 372.3. The resulting phosphite is useful for making rigid polyurethane foams.

Phosphites having 3 free hydroxyl groups can be prepared by reacting bis hydroxypropoxyphenyl alkanes with triaryl or trialkyl phosphites. An example of such a product is the reaction product of triphenyl phosphite with 2,2-[p-(2-hydroxypropoxy)phenyl]propane, said reaction product having the formula

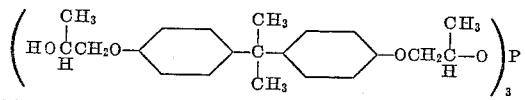

This compound also can be reacted with polyisocyanates to form rigid polyurethanes.

In place of the hydroxy propoxy group there can be a hydroxy polypropoxy group, e.g. by reacting the phenol with an excess of propylene oxide prior to formation of the phosphite. However, as previously stated for preparing rigid polyurethanes it is preferred to employ phosphites having a plurality of simple hydroxy propoxy groups.

*Example 29*

LK–380 has a hydoxyl number of 372.3. This corresponds to about 82% of the 1,1,3-tris(p-hydroxyphenyl) propane and about 18% of the glycerol propylene oxide adduct having a hydroxyl number of 625–650. The mixture is equivalent to a hypothetical compound having an average molecular weight of 452.2.

There was employed 2764 grams of LK–380 (6 moles+2% excess) and 620 grams (2 moles) of triphenyl phosphite. Six grams of diphenyl phosphite was employed as a catalyst. The mixture was heated at 120° C. for 0.5 hour and then distilled at a temperature which rose from 115° C. to 190° C. at 10 mm. There was recovered 1574 grams of 95% pure phenol. The mixture was further heated at 190–200° C. for one hour at 5 mm. with nitrogen sparging. Twenty-six more grams of distillate were obtained. The residue weighed 2790 grams. It was treated with diatomaceous earth and activated clay to obtain a clear, dark amber product which was semisolid at room temperature and a viscous liquid at 100° C.

The product was a mixture of the phosphite of 1,1,3-tris[p - (2 - hydoxypropoxy)phenyl]propane having the formula indicated supra and the glycerine-propylene oxide adduct phosphite.

Either the pure phosphite of 1,1,3- tris[p-(2-hydroxypropoxy)phenyl]propane or the pure glycerine-propylene oxide adduct phosphite can be made by utilizing the appropriate pure material.

*Example 30*

There was employed 3 moles of 2,2-[p-(2-hydroxypropoxy)phenyl]propane and one mole of triphenyl phosphite with 3 grams of diphenyl phosphite. The phenol formed was removed in the manner described in Example 29, until about 280 grams of phenol had been obtained. The residue in the pot was the phosphite of 2,2-[p-(2-hydroxypropoxy)phenyl]propane having the formula set forth above.

*Example 31*

Three moles of the tetra 2-hydroxypropoxy ether of pentaerythritol (pentaerythritol-propylene oxide adduct in a 1:4 mole ratio), one mole of triphenyl phosphite and 5 grams of diphenyl phosphite were heated to 150° C. in vacuo until about 3 moles of phenol were stripped off. The product obtained was the tris (pentaerythritol-propylene oxide adduct) phosphite.

Example 32

Formulation A was used omitting the water and employing 3.14 grams of the polyol phosphite prepared in Example 29 from LK-380 and triphenyl phosphite having a molecular weight of 1350 and an OH number of 250. The mixture was heated slightly to render it fluid. There was then added 5.2 grams of toluene diisocyanate with thorough mixing and the mixture allowed to react to form a prepolymer. There was then added 0.37 ml. of water and a nice light foam was obtained.

Example 33

Formulation A was used omitting the water and empolying 4.8 grams of the phosphite prepared in Example 30. There was then added 5.2 grams of toluene diisocyanate with thorough mixing and the mixture allowed to form a prepolymer. There was then added 0.37 ml. of water and a foam was obtained.

Example 34

Formulation A was used omitting the water and employing 5.0 grams of the phosphite prepared in Example 31. There was then added 5.2 grams of toluene diisocyanate and the mixture allowed to form a prepolymer. There was then added 0.37 ml. of water and a foam was obtained.

In Example 25 the dipropylene glycol tetrol diphosphite can be replaced by dipropylene glycol pentol triphosphite to produce dipropylene glycol pentol triphosphonate, molecular weight 1026, OH number 274. Similarly, in Example 25 by employing polypropylene glycol 425 tetrol diphosphite there is obtained polypropylene glycol 425 tetrol diphosphonate, molecular weight 2187, hydroxyl number 102.

Similarly, in Example 19 the tris dipropylene glycol phosphite can be replaced by tris polypropylene glycol 425 phosphite to produce tris polypropylene glycol 425 phosphonate, molecular weight 1306, hydroxyl number 129. Similarly, in Example 19 by employing tris LG-168 phosphite there is obtained a hexol phosphonate having a molecular weight of 3000 and a hydroxyl number of 112. Correspondingly, hexol phosphonate of molecular weight 2100, hydroxyl number 160, is obtained by utilizing tris LHT 240 phosphite in Example 19. Likewise, by utilizing tris LK 380 phosphite as the phosphite in Example 19 there is obtained the corresponding hexol phosphonate having a molecular weight of 1350 and hydroxyl number of 250. Also, by employing tris pentaerythritol-propylene oxide adduct phosphite, molecular weight 450, there is obtained the corresponding nonol phosphonate having a molecular weight of 1230 and a hydroxyl number of 410. The pentol, hexol and nonol phosphonates are useful for preparing rigid polyurethane foams.

Unsaturated phosphonates can be formed by reacting an excess of allyl chloride, methallyl chloride, allyl bromide, or methallyl bromide with tris-diethylene glycol phosphite or tris dipropylene glycol phosphite. These compounds are useful in preparing urethanes having the uses enumerated supra.

Example 35

One mole of tris diethylene glycol phosphite was refluxed with 6 moles of allyl chloride until there was no increase in P=O bond in the infrared analysis. Volatile material was stripped off first at atmospheric pressure up to 100° C. and then at 10 mm. and 150° C. to recover the bis diethylene glycol allylphosphonate, molecular weight 298, hydroxyl number 375, as a liquid.

Example 36

The process of Example 35 was repeated replacing the tris diethylene glycol phosphite by one mole of tris dipropylene glycol phosphite to produce bis-dipropylene glycol allylphosphonate, molecular weight 312, and hydroxyl number 360, as a liquid.

Example 37

The process of Example 35 was repeated replacing the allyl chloride by 6 moles of methallyl chloride to produce bis-diethylene glycol methallylphosphonate, molecular weight 354, hydroxyl number 316, as a liquid.

Example 38

The process of Example 37 was repeated but the tris diethylene glycol phosphite was replaced by one mole of tris dipropylene glycol phosphite to produce bis-dipropylene glycol methallylphosphonate, a viscous liquid having a molecular weight of 368 and a hydroxyl number of 305.

The compounds prepared in Examples 35–38 have the formula

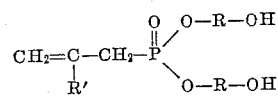

where R' is H or methyl and R is $-CH_2CH_2OCH_2CH_2-$ or

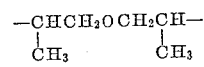

The diolalkene phosphonates thus produced can be polymerized, e.g., with free radical producing agents such as benzoyl peroxide, or reacted with di or other polycarboxylic acids to give air-drying polyesters. Alternatively, they can be reacted with polyisocyanates, e.g., toluene diisocyanate, to give polyurethanes which can be further polymerized by virtue of the ethylenic double bond to give products useful as coatings, castings, etc. The products are either self-extinguishing or nonburning. The diolalkenephosphonates can be copolymerized with other materials having ethylenic unsaturation, e.g., acrylates such as methyl acrylate, butyl acrylate and methyl methacrylate, styrene, acrylonitrile, ethylene and propylene. They can also be used as cross-linking agents. Additionally, the polymers produced can have enhanced dyeing properties because of the polarity introduced.

There can also be prepared neopentylene allylphosphonate, neopentylene methallylphosphonate, pentaerythritol diallylphosphonate and pentaerythritol dimethallylphosphonate. These materials have no hydroxyl groups. They are useful, however, as monomers which can be copolymerized with other materials to produce polymers of improved fire resistance and enhanced dyeing and printing characteristics. They can be copolymerized with acrylates and methacrylates such as methyl acrylate, butyl acrylate and methyl methacrylate, acrylonitrile and ethylenically unsaturated hydrocarbons such as styrene, ethylene, propylene and isobutylene.

These compounds can be prepared by reacting an excess of allyl chloride, allyl bromide, methallyl chloride or methallyl bromide with the appropriate phosphite.

Example 39

One mole of 2-decyloxy-5,5-dimethyl-1,3,2-dioxaphosphorinane was refluxed with 6 moles of allyl chloride until there was no increase in P=O bond in the infrared analysis. Volatile material was stripped off first atmospheric pressure up to 100° C. and then at 10 mm. and up to 150° C. to distill over the 2-allyl-2-oxo-5,5-dimethyl-1,3,2-dioxaphosphorinane as liquid followed by the decyl chloride. When methallyl bromide is substituted for allyl chloride, the corresponding 2-methallyl - 2 - oxo-5,5-dimethyl-1,3,2-dioxaphosphorinane is produced.

Example 40

The procedure of Example 39 is repeated employing one mole of 3,9-didecyloxy-2,4,8,10-tetraoxa-3,9-diphosphaspiro [5,5] undecane in place of the dioxaphosphorinane compound. There was obtained 3,9-diallyl-3,9-dioxo-2,4,3,10-tetraoxa-3,9-diphosphaspiro [5,5] undecane as the solid residue. This compound can also be called pentaerythritol diallyl diphosphonate.

When methallyl bromide is substituted for allyl chloride in Example 40, the corresponding pentaerythritol diallyl diphosphonate is produced.

Example 41

The low molecular weight polymer prepared from 1 mole of pentaerythritol, 2 moles of triphenyl phosphite and 1.1 moles (a 0.1 mole excess) of diethylene glycol (prepared according to application Ser. No. 111,899, filed May 23, 1961) was refluxed for 5 hours with 6 moles of allyl chloride (200% excess) until rearrangement was complete. Excess allyl chloride followed by $\beta,\beta'$-dichlorodiethyl ether, diethylene glycol and $\beta$-hydroxyethoxyethyl chloride were removed by vacuum distillation. The residue was essentially pure pentaerythritol diallyl diphosphonate.

In a similar manner, one mole of the linked phosphorinane prepared from neopentylene glycol, triphenyl phosphite and diethylene glycol prepared according to Friedman et al. application Ser. No. 56,129, filed Sept. 15, 1960, now U.S. Patent No. 3,047,608, is reacted with 3 moles of allyl chloride (in excess) to produce the neopentylene allyl phosphonate of Example 39.

Example 42

18 grams of bis-dipropylene glycol allyl phosphonate and 20.4 grams of toluene diisocyanate were dissolved in a mixture of 20 grams of Cellosolve acetate (ethoxyethyl acetate) and 20 grams of toluene and refluxed for one hour. The initial reaction was exothermic. The resulting solution was useful for the preparation of urethane coatings by spraying, dipping or painting. Curing was effected by atmospheric moisture. The resultant products were hard, clear, flame-resistant coatings, e.g., on wood.

Example 43

62 grams of bis dipropylene glycol allyl phosphonate and 34 grams of toluene diisocyanate in a mixture of 40 grams of Cellosolve acetate and 40 grams of toluene were heated in the presence of 0.02 ml. of N-methylmorpholine for 6 hours. The solution became more viscous and the product was essentially a linear polyurethane with pendant allyl groups. One gram of benzoyl peroxide was added to the cooled solution. The solution was then sprayed onto wood and metal strips, excess solvent allowed to evaporate and then the coating was cured at 80° C. in an oven for 2 hours. The product was a clear, hard, nonflammable, almost colorless coating.

Example 44

62 grams of bis dipropylene glycol allyl phosphonate and 33 grams of adipic acid were esterified in the presence of Dowex-50 cation exchange resin (sulfonated styrene-divinyl benzene copolymer) as a catalyst. The water formed was azeotroped out with toluene. When esterification was complete, the ion exchange resin was removed by filtration and the toluene solution concentrated to 50%. Brush application to wood and metal gave a lacquer which was cured by air drying. The surface was clear, very hard, tough and nonflammable.

According to the present invention, there can be made numerous compounds having the formula

[(HO)$_n$RO]$_2$P—R'OH where $n$ is an integer, usually between 1 and 6, and R is aliphatic hydrocarbon or hydrocarbon ether and R' is hydrocarbon. Further examples of such compounds are given below. These compounds have all the uses of the hydroxy containing phosphites and phosphonates previously set forth.

Example 45

300 grams (0.95 mole) of bis dipropylene glycol hydrogen phosphite and 5 grams of triethylamine (catalyst) were treated with cooling and 44 grams (1 mole) of acetaldehyde. The reaction was exothermic. When reaction appeared to be complete, the mixture was heated on a steam bath for one hour and then stripped in vacuum at 100° C. to remove catalyst and excess acetaldehyde. To help facilitate removal of these components, nitrogen sparging was also used. There was recovered bis dipropylene glycol $\alpha$-hydroxyethane phosphonate as a liquid, molecular weight 358, and hydroxyl number 462. Other tertiary amines and basic catalysts can be used.

There can be used an anion exchange resin as the catalyst. Thus, quaternary ammonium ion exchange resins of the Dowex and Amberlite type (quaternarized aminomethyl styrene-divinyl benzene copolymers) can be used.

Example 46

430 grams of tris dipropylene glycol phosphite (1.0 mole) and 0.2 ml. of concentrated hydrochloric acid were treated with 18.0 grams of water to produce the bis dipropylene glycol hydrogen phosphite by hydrolysis. Excess strongly basic Amberlite IR-410 ion exchange resin was then added followed by 50 grams (an excess) of acetaldehyde. When the reaction appeared to be complete, the mixture was heated for one hour at 100° C. The catalyst was filtered off, the filtrate stripped in high vacuo, with a nitrogen gas stream to help remove dipropylene glycol. The product was identical with that in Example 1.

Example 47

Tris dipropylene glycol dihydrogen diphosphite (prepared by acid hydrolysis of dipropylene glycol tetrol diphosphite in a manner similar to that described in Example 46 for bis dipropylene glycol hydrogen phosphite or by the self-condensation of bis dipropylene glycol hydrogen phosphite) in an amount of 225 grams (0.5 mole) and 10 grams of Amberlite IR-410 were treated as in Example 46 with 44 grams (1 mole) of acetaldehyde. The reaction was exothermic and rapid. The mixture was heated to 100° C., maintained at 100° C. for one hour, the catalyst removed by filtration and the filtrate stripped under vacuum to remove volatiles. The liquid product was tris dipropylene glycol bis ($\alpha$-hydroxy ethane) phosphonate.

Example 48

In a manner similar to Example 46 there was reacted 30 grams of formaldehyde generated by the decomposition of trioxane with bis dipropylene glycol hydrogen phosphite to give bis dipropylene glycol hydroxymethane phosphonate, molecular weight 344, hydroxyl number 480.

In similar fashion, tris dipropylene glycol bis hydroxymethane diphosphonate was prepared from formaldehyde and tris dipropylene glycol dihydrogen diphosphite. The product was a liquid.

Example 49

25 grams of bis dipropylene glycol $\alpha$-hydroxyethane phosphonate and 65 grams of toluene diisocyanate were stirred continuously without external heat until a temperature of 100° C. was reached. This temperature was maintained for one hour. The viscous mixture was cooled and allowed to remain overnight. The properties of the resultant prepolymer were viscosity at 25° C. about 5000 cps., free NCO content about 25%, yield 90 grams.

To 50 grams of the prepolymer there was added with agitation a mixture of Silicone DC 199 (a polydimethylsiloxane) in an amount of 0.25 gram, 0.5 gram of diethanolamine, 0.75 gram of water, 13.0 grams of bis dipropylene glycoll α-hydroxyethane phosphonate and 5.0 grams of Quadrol. The mixture was allowed to foam and became tack free in about 15 minutes. The foam had a density of about 3 lbs./cubic foot, and was useful as a rigid nonflammable foam.

What is claimed is:

A heterocyclic phosphonate having a formula selected from the group consisting of (a) 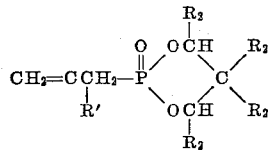

and (b) 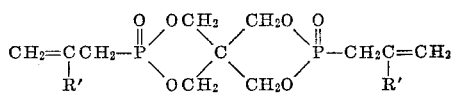

where R' is selected from the group consisting of hydrogen and methyl and $R_2$ is selected from the group consisting of hydrogen and lower alkyl.

No references cited.

CHARLES B. PARKER, *Primary Examiner.*

A. H. SUTTO, *Assistant Examiner.*